United States Patent
Okada

(10) Patent No.: US 8,596,065 B2
(45) Date of Patent: Dec. 3, 2013

(54) CONTROL DEVICE FOR INTERNAL COMBUSTION ENGINE

(75) Inventor: Yoshihiro Okada, Susono (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 332 days.

(21) Appl. No.: 13/000,161

(22) PCT Filed: Mar. 9, 2010

(86) PCT No.: PCT/JP2010/053896
§ 371 (c)(1),
(2), (4) Date: Dec. 20, 2010

(87) PCT Pub. No.: WO2011/111171
PCT Pub. Date: Sep. 15, 2011

(65) Prior Publication Data
US 2011/0252786 A1    Oct. 20, 2011

(51) Int. Cl.
*F02M 25/07*    (2006.01)

(52) U.S. Cl.
USPC .. 60/605.2; 60/611; 123/568.17; 123/568.18; 123/568.2

(58) Field of Classification Search
USPC ............... 60/611, 605.2; 123/568.17, 568.18, 123/568.2
IPC ........... F02B 37/00,37/013, 37/16; F02M 25/07
See application file for complete search history.

(56) References Cited

U.S. PATENT DOCUMENTS

| | | | |
|---|---|---|---|
| 4,956,973 A * | 9/1990 | Fortnagel et al. | 60/605.2 |
| 6,675,579 B1 * | 1/2004 | Yang | 60/599 |
| 6,701,710 B1 * | 3/2004 | Ahrens et al. | 60/605.2 |
| 6,948,475 B1 * | 9/2005 | Wong et al. | 123/299 |
| 7,080,511 B1 * | 7/2006 | Bolton et al. | 60/611 |
| 7,380,400 B2 * | 6/2008 | Barbe et al. | 60/605.2 |
| 7,480,557 B2 * | 1/2009 | Yamaguchi et al. | 701/104 |
| 7,654,086 B2 * | 2/2010 | Gong et al. | 60/611 |
| 8,056,544 B2 * | 11/2011 | Webb et al. | 123/568.12 |
| 8,108,129 B2 * | 1/2012 | Nakayama et al. | 701/108 |
| 8,122,717 B2 * | 2/2012 | Joergl et al. | 60/605.1 |
| 2004/0084031 A1 * | 5/2004 | Ito et al. | 123/568.21 |
| 2009/0007563 A1 | 1/2009 | Cooper et al. | |
| 2009/0132153 A1 * | 5/2009 | Shutty et al. | 701/108 |
| 2009/0223219 A1 * | 9/2009 | Joergl et al. | 60/602 |
| 2009/0260603 A1 * | 10/2009 | Bucknell | 123/564 |

FOREIGN PATENT DOCUMENTS

| | | |
|---|---|---|
| JP | 4-34451 U | 3/1992 |
| JP | 05-202809 A | 8/1993 |
| JP | 05-256213 A | 10/1993 |
| JP | 07-091326 A | 4/1995 |
| JP | 2005-090468 A | 4/2005 |
| JP | 2009-074459 A | 4/2009 |
| JP | 2009-138722 A | 6/2009 |

* cited by examiner

*Primary Examiner* — Thomas Denion
*Assistant Examiner* — Thomas Olszewski
(74) *Attorney, Agent, or Firm* — Kenyon & Kenyon LLP

(57) ABSTRACT

There is provided a control device for an internal combustion engine capable of suppressing trouble such that the gas having an EGR ratio higher than necessary is sucked with the opening of an intake air bypass passage. A supercharger having a compressor is provided in an intake air passage of an internal combustion engine. An EGR passage and an EGR valve are provided. The intake air bypass passage connects the upstream side of the compressor in the intake air passage to the downstream side of the compressor in the intake air passage. The intake air bypass passage is provided with an air bypass valve (ABV). The EGR valve is closed simultaneously with the operation of the ABV.

4 Claims, 5 Drawing Sheets

BEFORE ABV OPERATION

AFTER ABV OPERATION

BEFORE ABV OPERATION

AFTER ABV OPERATION

CONTROL DEVICE FOR INTERNAL COMBUSTION ENGINE

This is a 371 national phase application of PCT/JP2010/053896 filed 9 Mar. 2010, the content of which is incorporated herein by reference.

TECHNICAL FIELD

The present invention relates to a control device for an internal combustion engine.

BACKGROUND ART

Conventionally, there has been known an internal combustion engine equipped with an EGR (Exhaust Gas Recirculation) system for circulating exhaust gas after combustion to an intake air passage as disclosed, for example, in Japanese Unexamined Patent Application Publication No. 2009-74459.

The internal combustion engine disclosed in the aforementioned Publication is provided with a supercharger and two EGR paths. A first path is a path for circulating exhaust gas after combustion from the upstream side of a turbine of a supercharger to the downstream side of a compressor thereof. The EGR system having such an EGR path is also called HPL(High Pressure Loop)-EGR system. A second path is a path for circulating exhaust gas after combustion from the downstream side of the turbine of the supercharger to the upstream side of the compressor thereof. The EGR system having such an EGR path is also called LPL(Low Pressure Loop)-EGR system.

CITATION LIST

Patent Literature

Patent Literature 1: Japanese Unexamined Patent Application Publication No. 2009-74459
Patent Literature 2: Japanese Unexamined Patent Application Publication No. 2009-138722

SUMMARY OF INVENTION

Technical Problem

In some internal combustion engine having the supercharger, an intake air bypass passage that connects the downstream side of the compressor of the supercharger to the upstream side thereof is provided. A valve for opening and closing this intake air bypass passage is hereinafter referred also to as an air bypass valve (ABV).

In the internal combustion engine, in which exhaust gas is circulated to the upstream side of compressor like the LPL-EGR system, as well, the intake air bypass passage is provided in some cases. In this configuration, when the ABV is opened, some of the intake air on the downstream side of the compressor returns to the upstream side of the compressor. On the other hand, in the case where exhaust gas is circulated to the upstream side of the compressor by the EGR system, the intake air on the downstream side of the compressor is in a state in which exhaust gas (EGR gas) has already been added. If the intake air to which exhaust gas has been added is returned to the upstream side of the compressor by the operation of ABV during the circulation of exhaust gas to the upstream side of the compressor accomplished by the EGR system, there is a fear that EGR gas having unexpectedly high exhaust gas concentration is generated. It is unpreferable that the gas having an EGR ratio higher than necessary is sucked into the internal combustion engine.

The present invention has been made to solve the above problem, and accordingly an object thereof is to provide a control device for an internal combustion engine capable of suppressing trouble such that the gas having an EGR ratio higher than necessary is sucked with the opening of an intake air bypass passage.

Solution to Problem

To achieve the above-mentioned purpose, a first aspect of the present invention is a control device for an internal combustion engine comprising:

a supercharger having a compressor provided in an intake air passage of the internal combustion engine, EGR means for circulating exhaust gas of the internal combustion engine to the upstream side of the compressor in the intake air passage;

an intake air bypass passage for connecting the upstream side of the compressor in the intake air passage to the downstream side of the compressor in the intake air passage;

opening/closing means provided in the intake air bypass passage, and

EGR amount control means for reducing the amount of exhaust gas circulated to the upstream side of the compressor when the opening/closing means opens the intake air bypass passage to a degree of opening exceeding a predetermined degree of opening of zero or larger.

A second aspect of the present invention is the control device for an internal combustion engine according to the first aspect, wherein the EGR amount control means includes EGR amount recovery means for, after the amount of exhaust gas has been reduced, increasing the amount of the exhaust gas from the reduced level when a predetermined time period has elapsed.

A third aspect of the present invention is the control device for an internal combustion engine according to the second aspect, wherein the predetermined time period is a time period of a degree such that the gas which is returned from the downstream side of the compressor to the upstream side of the compressor via the intake air bypass passage by the opening of the intake air bypass passage passes through the position at which the downstream side of the compressor is connected to an EGR passage in the intake air passage.

A fourth aspect of the present invention is the control device for an internal combustion engine according to any one of the first aspect to the third aspect, wherein the EGR means includes the EGR passage one end of which is connected to the upstream side of the position at which the intake air bypass passage is connected to the upstream side of the compressor in the intake air passage and the other end of which is connected to an exhaust gas passage; and the EGR amount control means includes means for reducing the amount of exhaust gas flowing in the EGR passage when the opening/closing means opens the intake air bypass passage to a degree of opening exceeding the predetermined degree of opening.

A fifth aspect of the present invention is the control device for an internal combustion engine according to any one of the first aspect to the fourth aspect, wherein the control device further comprises second EGR means for circulating exhaust gas of the internal combustion engine to the downstream side of the compressor in the intake air passage;

the EGR means for circulating exhaust gas to the upstream side of the compressor is an LPL(Low Pressure Loop)-EGR system; and the second EGR means for circulating exhaust gas to the downstream side of the compressor is an HPL(High Pressure Loop)-EGR system.

Advantageous Effects of Invention

According to the first invention, the EGR amount control means can regulate the EGR amount so that the EGR gas having an EGR ratio higher than necessary is restrained from being generated. Thereby, trouble such that the gas having an EGR ratio higher than necessary is sucked can be suppressed.

According to the second invention, the EGR amount can be recovered so as to be returned to the normal state after being restrained at necessary timing.

According to the third invention, after the generation of the gas having the above-described high EGR ratio has been avoided, EGR can be restarted at proper timing such that there is no fear of generation of the gas having the high EGR ratio.

According to the fourth invention, when the intake air bypass passage is opened, the generation and suction of the EGR gas having an excessively high EGR ratio are restrained, and a sudden decrease in EGR ratio can also be restrained.

According to the fifth invention, in the internal combustion engine using both of the LPL-EGR system and the HPL-EGR system, the EGR amount in the LPL-EGR system can be regulated so that trouble such that the EGR gas having an excessively high EGR ratio is sucked is suppressed.

REFERENCE SIGNS LIST

Figure 1:
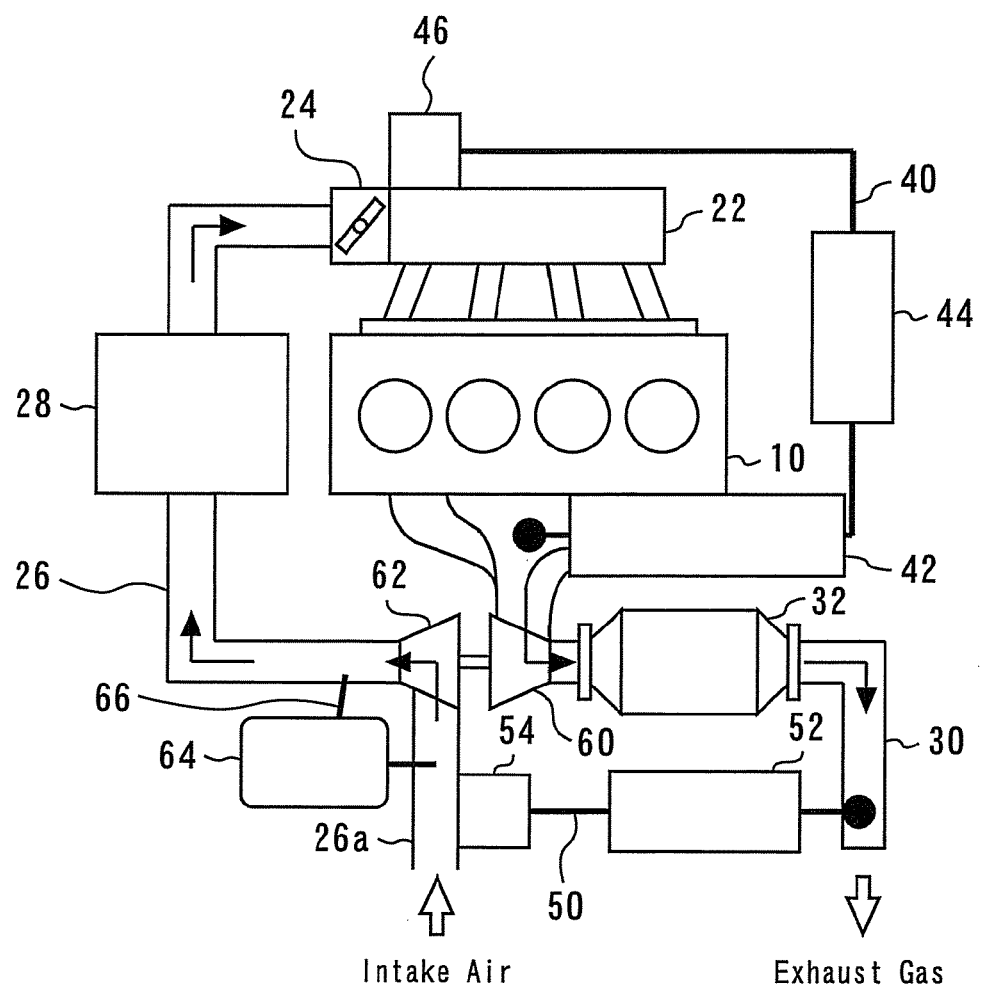
FIG. 1 is a schematic view showing a configuration of a control device for an internal combustion engine in accordance with an embodiment of the present invention.

10 an internal combustion engine body
22 a surge tank
24 a throttle
26 an intake air passage
28 an intercooler
30 an exhaust pipe
32 a catalyst
40 an EGR passage
42 an EGR catalyst
44 an EGR cooler
46 an EGR valve
50 an EGR passage
52 an EGR catalyst
54 an EGR valve
60 a turbine
62 a compressor
64, 164 an ABV (Air Bypass Valve)
66, 166 an intake air bypass passage

DESCRIPTION OF EMBODIMENTS

Embodiment

[Configuration in Accordance with Embodiment]

FIG. 1 is a schematic view showing a configuration of a control device for an internal combustion engine in accordance with an embodiment of the present invention. The control device in accordance with the embodiment can be used suitably for the control of an automotive internal combustion engine.

FIG. 1 shows an internal combustion engine body 10. The internal combustion engine body 10 is specifically made up of various parts such as a cylinder block, cylinder head pistons, and a crankshaft. Intake air ports of the internal combustion engine body 10 are connected to an intake air passage 26. In the intake air passage 26, intake air multiple branch pipes, a surge tank 22, a throttle 24, and an intercooler 28 are provided. The internal combustion engine body 10 is connected to an exhaust pipe 30 via exhaust gas multiple branch pipes. The exhaust pipe 30 is provided with a catalyst 32. This catalyst 32 can be a three way catalyst.

In this embodiment, a supercharger having a compressor 62 and a turbine 60 is provided. As shown in FIG. 1, the compressor 62 is disposed in the intake air passage 26, and the turbine 60 is disposed on the upstream side of the catalyst 32. The compressor 62 discharges the air, which is sucked through an inlet 26a of the intake air passage 26, to the downstream side.

In this embodiment, as a device for accomplishing EGR (Exhaust Gas Recirculation) to the internal combustion engine body 10, both of an LPL(Low Pressure Loop)-EGR system and an HPL(High Pressure Loop)-EGR system are provided. In FIG. 1, an EGR passage 40, an EGR cooler 44, an EGR catalyst 42, and an EGR valve 46 constitute the HPL-EGR system. The EGR passage 40 connects the exhaust gas multiple branch pipes to the surge tank 22.

Figure 2:
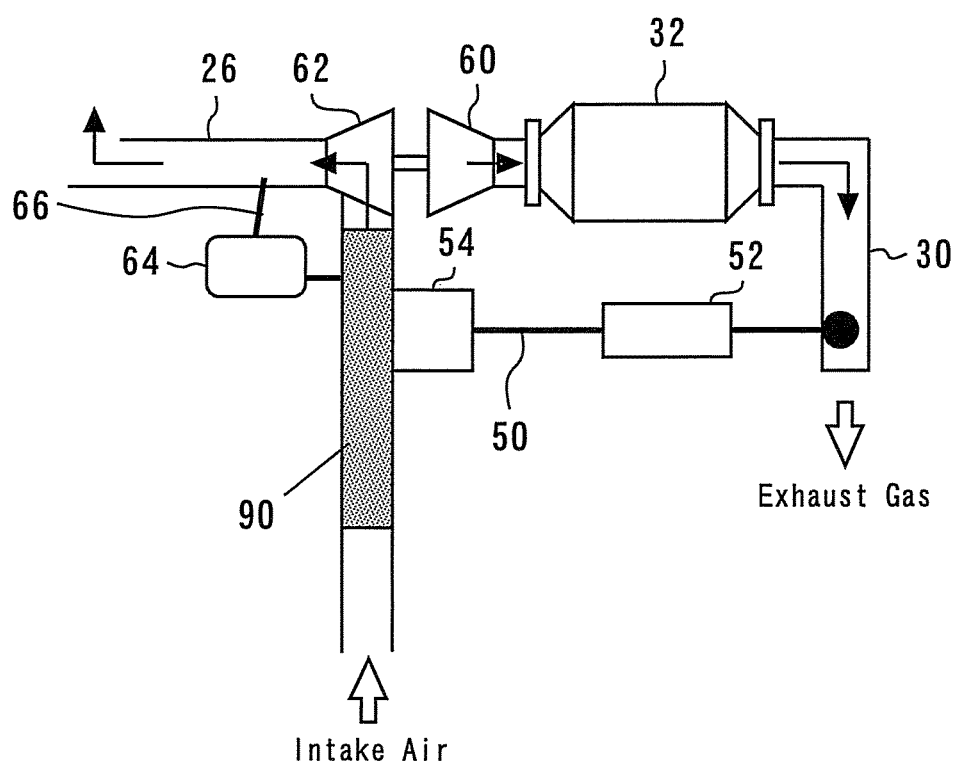
FIG. 2 is a schematic view showing a configuration of a control device for an internal combustion engine in accordance with an embodiment of the present invention.

On the other hand, an EGR passage 50, an EGR cooler 52, and an EGR valve 54 constitute the LPL-EGR system. The EGR passage 50 connects the downstream side of the catalyst 32 in the exhaust pipe 30 to the upstream side of the compressor 62 in the intake air passage 26. FIG. 2 is an enlarged view in which the configuration around the compressor 62 in FIG. 1 is enlarged partially. In this embodiment, as shown in FIG. 2, one end of the EGR passage 50 is connected to the further upstream side of the compressor 62 as compared with the position at which an intake air bypass passage 66 is connected to the upstream side of the compressor 62. Thereby, the position at which exhaust gas is introduced into the intake air passage 26 in the LPL-EGR system can be set on the upstream side of the position at which the intake air bypass passage 66 is connected to the intake air passage 26.

In the system in which both of the HPL-EGR and LPL-EGR are used, in the LPL, EGR at a certain EGR ratio is accomplished steadily, and in the HPL, the EGR ratio can be controlled depending on the operating conditions. In this case, the EGR ratio in the LPL is set at an EGR ratio corresponding to the idling time or the deceleration time at which the combustion resistance is the lowest. It can be said that such a system is a system that aims at raising of EGR ratio due to LPL at high loads. Specifically, the EGR ratio in HPL can be made, for example, about 15 to 25%, and the EGR ratio in LPL can be made as low as, for example, about 5 to 10%.

In this embodiment, the intake air passage 26 is provided with the intake air bypass passage 66 that bypasses the compressor 62. The intake air bypass passage 66 connects the upstream side of the compressor 62 to the downstream side of the compressor 62. The opening/closing of the intake air bypass passage 66 is performed by an ABV (Air Bypass Valve) 64.

The configuration in accordance with this embodiment includes an ECU (Electronic Control Unit) 80 as a control device. The ECU 80 can operate the EGR valves 46 and 54 and the ABV 64. The ECU 80 can control various factors (throttle opening, valve timing, fuel injection amount, etc.) based on the operating conditions of the internal combustion engine body 10. Also, the ECU 80 connects with various sensors (not shown) provided at locations of a system including the periphery of the internal combustion engine body 10. In receipt of output signals sent from the various sensors, the ECU 80 can acquire various items of information concerning engine operation. Specifically, in this embodiment, based on the sensor values, the ECU 80 can acquire various items of information such as surge tank pressure, air flowmeter, intake air temperature, and throttle opening.

[Operation and Effects of Control Device in Accordance with the Embodiment]

Hereunder, the operation of the control device for an internal combustion engine in accordance with the embodiment is described. In the description below, (1) control action and (2) effects achieved by the configuration of the intake air bypass passage 66 and the LPL-EGR system in accordance with this embodiment are explained.

(1) Control Action

In FIG. 2, reference numeral 90 denotes a gas returned from the downstream side of the compressor 62 to the upstream side thereof when the ABV 64 is opened. To the gas 90, exhaust gas (EGR gas) has been added by the LPL-EGR system in the process in which the gas 90 passes through the compressor 62 once. If exhaust gas is added again to the gas 90 in the process in which the gas 90 flows through a portion near the EGR valve 54, the gas to which exhaust gas is added in larger amounts than expected is undesirably sucked in the intake air passage 26.

To solve this problem, in this embodiment, simultaneously with the operation of the ABV 64, the EGR valve 54 in the LPL-EGR system is closed. Thereby, the above-described excessive addition of exhaust gas can be restrained. As a result, the EGR gas having a EGR ratio higher than necessary can be restrained from being generated, and the gas having such a high EGR ratio can be restrained from being sucked.

Also, according to this embodiment, in the internal combustion engine using both of the LPL-EGR system and the HPL-EGR system, the EGR amount in the LPL-EGR system can be regulated so that trouble is suppressed such that the EGR gas having an excessively high concentration is generated and sucked.

As described above, in this embodiment, the EGR ratio in the LPL is set at an EGR ratio corresponding to the idling time or the deceleration time at which the combustion resistance is the lowest. If the EGR gas having an excessively high EGR ratio is generated and sucked under the operating condition in which the combustion resistance is low, for example, at the idling time, there are fears of unstable combustion, deterioration in torque fluctuations, and occurrence of misfire. According to this embodiment, by closing the EGR valve 54 according to the operation of the ABV 64, the EGR gas can be restrained from being highly concentrated by LPL-EGR, and troubles such as deterioration in torque fluctuations and occurrence of misfire can be suppressed.

Figure 4:
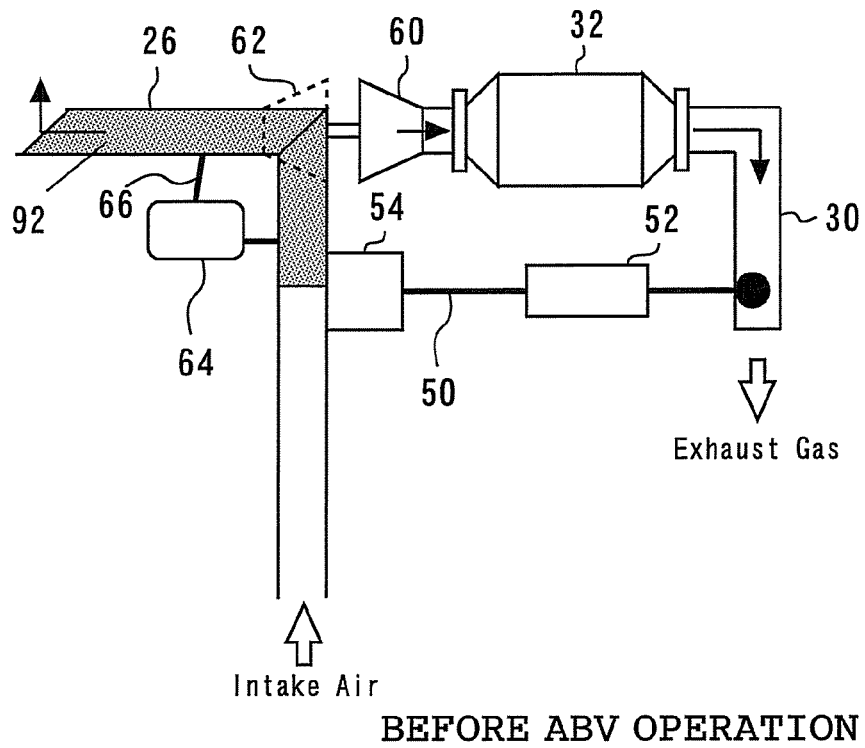
FIG. 4 is a schematic view for explaining the feature of the configuration of an intake air bypass passage and an LPL-EGR system in accordance with an embodiment of the present invention.
Figure 5:
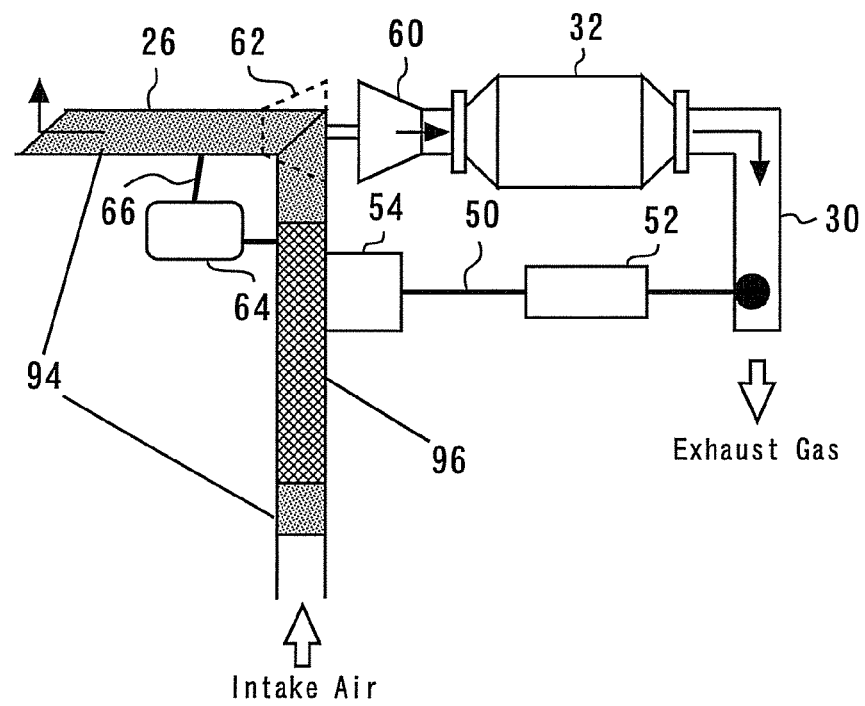
FIG. 5 is a schematic view for explaining the feature of the configuration of an intake air bypass passage and an LPL-EGR system in accordance with an embodiment of the present invention.

(2) Effects Achieved by the Configuration of the Intake Air Bypass Passage 66 and The LPL-EGR System FIGS. 4 and 5 are schematic views for explaining the features of the configuration of the intake air bypass passage 66 and the LPL-EGR system in accordance with the embodiment of the present invention. The configuration shown in FIGS. 4 and 5 is the same as the configuration shown in FIG. 2. For convenience, the compressor 62 is indicated by a broken line. In this embodiment, the position at which the EGR gas is introduced into the intake air passage 26 in the LPL-EGR system is set on the upstream side of the position at which the intake air bypass passage 66 is connected to the intake air passage 26 on the upstream side of the compressor 62 (that is, so as to be separate from the inlet of the compressor 62). Thereby, a temporary decrease in EGR ratio after the operation of the ABV 64 can be restrained.

Figure 6:
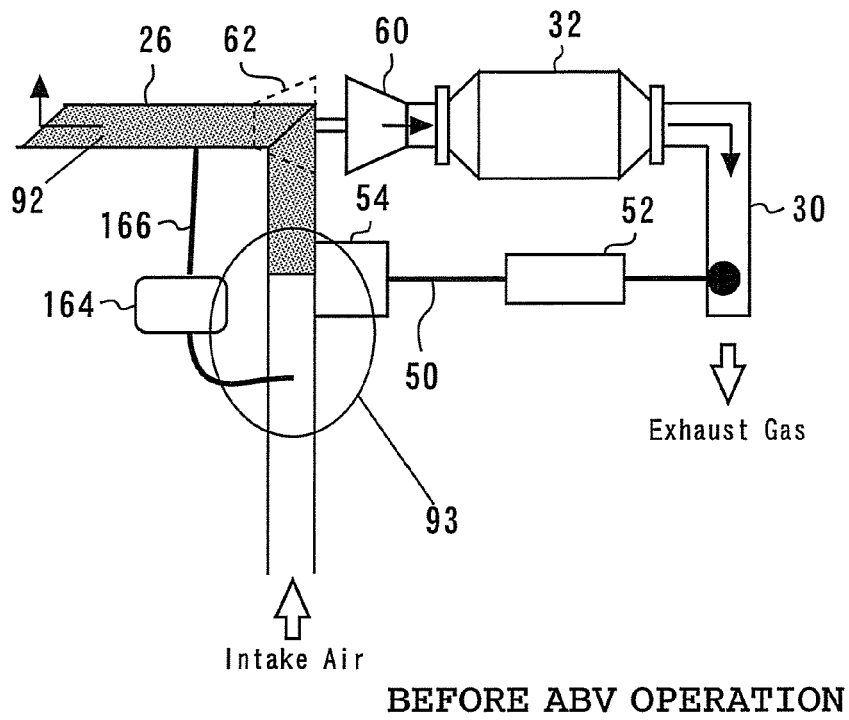
FIG. 6 is a schematic view showing a comparative example for explaining an effect achieved by a configuration in accordance with an embodiment of the present invention.
Figure 7:
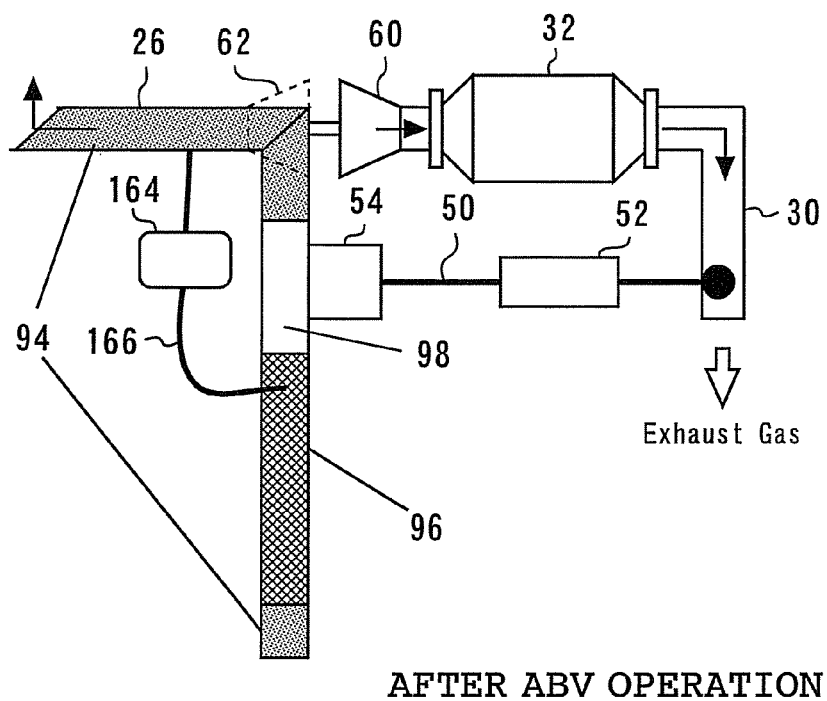
FIG. 7 is a schematic view showing a comparative example for explaining an effect achieved by a configuration in accordance with an embodiment of the present invention.

Herein, FIGS. 6 and 7 are referred to. FIGS. 6 and 7 are schematic views showing a comparative example for explaining the effects achieved by the configuration in accordance with the embodiment. The configuration shown in FIGS. 6 and 7 is the same as the configuration of this embodiment except that the intake air bypass passage 66 and the ABV 64 are replaced with an intake air bypass passage 166 and an ABV 164, respectively. In the configuration of comparative example shown in FIGS. 6 and 7, the position at which the intake air bypass passage 166 is connected to the intake air passage 26 on the upstream side of the compressor 62 is set on the upstream side of the position at which the EGR valve 54 is connected to the intake air passage 26. Thus, between the configuration of comparative example and the configuration in accordance with the present invention, the positions of the intake air bypass passage 166 and the EGR valve 54 (that is, the positions of the intake air bypass passage 166 and the EGR passage 50) are different (reversed).

In FIGS. 4, 5, 6 and 7, reference numerals 92, 94, 96 and 98 denote gases in the intake air passage 26. The gas 92 is intake air subjected to EGR, that is, fresh air containing exhaust gas. The gas 94 is fresh air into which the EGR gas has been introduced before the operation of the ABV. The gas 96 is a gas returned to the upstream side of the compressor 62 via the intake air bypass passage 166 after the operation of the ABV 164. Hereinafter, the gas 96 is referred to as a "return gas 96" for convenience. Also, the gas 98 is air to which exhaust gas is not added.

In the configuration of comparative example, if the EGR valve 54 is closed when the ABV 164 is operated (that is, when the intake air bypass passage 166 is opened), a fresh air layer is undesirably formed by the gas 98 at the position denoted by reference numeral 93 in FIG. 6. As schematically shown in FIG. 7, a layer of the gas 98 only (a fresh air layer) is formed in a part of the intake air passage 26. If this fresh air layer is sucked into the cylinders of the internal combustion engine body 10, the EGR ratio is suddenly decreased temporarily. Such a sudden decrease in EGR ratio may unpreferably lead to the occurrence of knocking. It is also conceivable that this problem may be solved by the lag of ignition timing. In this case, however, it is required that the exact timing of sudden decrease in EGR ratio be identified, the fresh air layer be mixed with the surrounding gas in the intake air passage 26, and the EGR ratio and the like of each cylinder be considered. It is difficult to calculate the exact lag amount of ignition timing considering these items.

Therefore, in this embodiment, the position at which the EGR gas is introduced into the intake air passage 26 in the LPL-EGR system is set on the upstream side of the position at which the intake air bypass passage 66 is connected to the intake air passage 26 on the upstream side of the compressor 62 (that is, so as to be separate from the inlet of the compressor 62). Thereby, as shown in FIG. 5, when the ABV 64 is operated, the return gas 96 can be returned to the upstream side of the compressor 62 without the formation of a fresh air layer effected by the gas 98. Thus, according to this embodiment, after the EGR valve 54 has been closed with the operation of the ABV 64, the gases 94 and 96 having the same EGR ratio can be sucked while the formation of fresh air layer is avoided. As a result, a sudden change of EGR ratio as shown in FIG. 7 can be restrained.

[Specific Processing in Accordance with the Embodiment]

Figure 3:
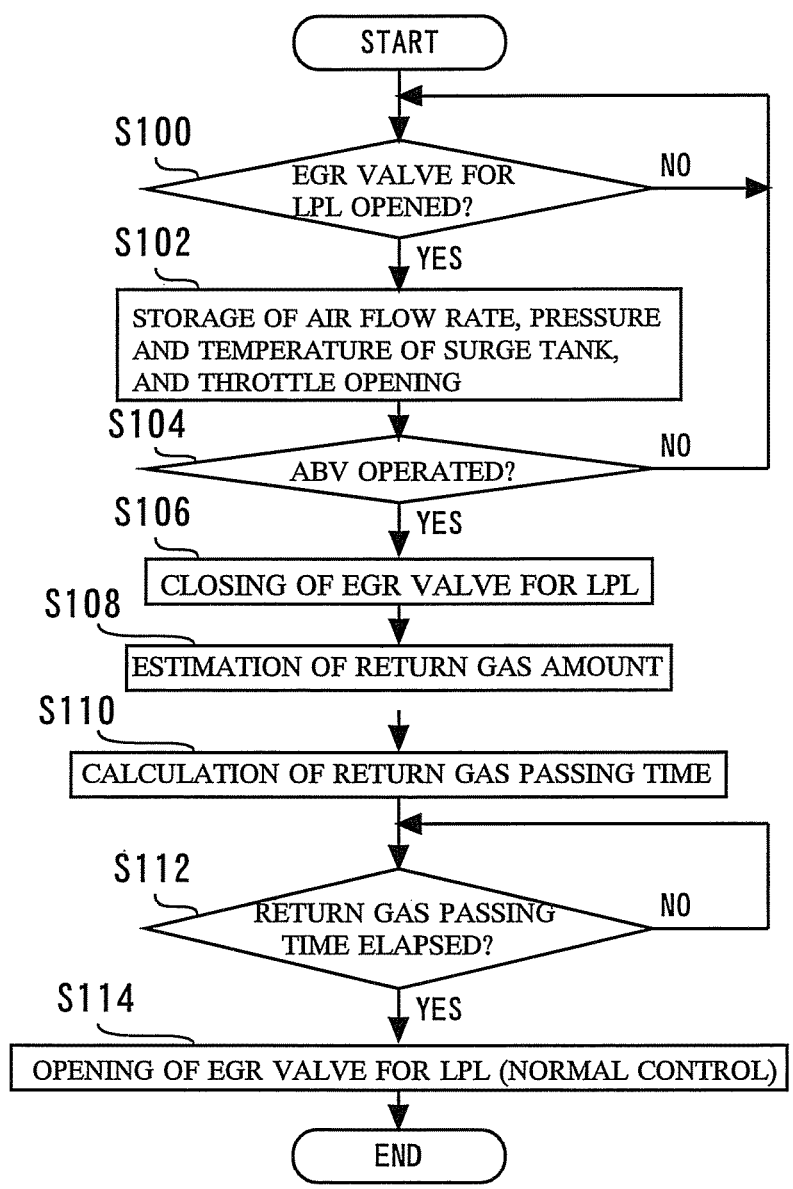
FIG. 3 is a flowchart for a routine executed in a control device for an internal combustion engine in accordance with an embodiment of the present invention.

FIG. 3 is a flowchart for a routine executed by the ECU 80 in the control device for an internal combustion engine in accordance with the embodiment of the present invention.

In the routine shown in FIG. 3, first, it is judged whether or not the EGR valve for LPL is open (step S100). For example, before the warm-up of engine, in some cases, the EGR valve 54 is closed, and EGR is not accomplished, that is, the LPL-EGR system is not operated. In this case, the control in accordance with this embodiment is not carried out. As the judgment in this step, specifically, for example, it is judged whether or not the ECU 80 generates a control signal for opening the EGR valve 54. Alternatively, in the case where an opening sensor for detecting the degree of opening of the EGR valve 54 is provided, the judgment may be made based on the output signal of that sensor. If the condition of this step is not met, the processing loops until the condition of this step is met.

When the meeting of the condition in step S100 is recognized, processing for storing the air flow rate, the pressure and temperature of surge tank, and the throttle opening is executed (step S102). In this step, to estimate the amount of the return gas 96, the state of the intake system before the operation of the ABV 64 is grasped.

Next, it is judged whether or not the ABV 64 has been operated (step S104). In this step, specifically, like the above-described judgment of the opened/closed state of the EGR valve 54, based on the control signal of the ECU 80, or based on the output signal of an opening sensor if the opening sensor for detecting the degree of opening of the ABV 64 is provided, it is judged whether or not the ABV 64 has been opened. If the condition of this step is not met, the processing loops.

If the condition in step S104 is met, processing for closing the EGR valve for LPL is executed (step S106). The transfer to the processing in step S106 means that both the conditions in steps S100 and S104 are met, that is, the ABV 64 has been operated during the time when the EGR valve 54 is open. Therefore, in this embodiment, the ECU 80 generates a control signal so as to close the EGR valve 54 quickly after the condition in step S104 has been met, so that the EGR valve 54 is closed almost simultaneously with the operation of the ABV 64. Alternatively, the operation of the ABV 64 is made on standby at the stage at which the condition for operating the ABV 64 is met, and the timing of the processing for operating the ABV 64 and the processing for closing the EGR valve 54 may be regulated so that the operation of the ABV 64 and the closing of the EGR valve 54 are performed at the same time.

Next, the amount of the return gas is estimated (step S108). In this step, specifically, the amount of the return gas 96 may be calculated estimatingly from the physical quantity and pressure loss of intake system stored in step S102.

Next, processing for calculating return gas passing time is executed (step S110). In this step, the return gas passing time means "time taken until the return gas 96 finishes passing through an EGR gas introduction portion in the LPL-EGR system (that is, the position at which the intake air passage 26 is connected to the EGR valve 54)". This time may be determined according to the operating conditions of the internal combustion engine body 10 after the operation of the ABV 64.

Next, it is judged whether or not the return gas passing time has elapsed (step S112). The processing loops until the elapse of the return gas passing time is recognized.

If it is recognized that the condition in step S112 is met, processing for opening the EGR valve for LPL is executed (step S114). In this step, the EGR valve 54 having been closed in step S106 is opened again. With the opening of the EGR valve 54, the processing returns to the normal control.

According to the above-described processing, the EGR valve 54 can be closed according to the operation of the ABV 64. Thereby, the EGR gas can be restrained from having an EGR ratio higher than necessary. Thus, by the above-described processing, the amount of exhaust gas circulated in the LPL-EGR system (EGR amount) can be regulated so that trouble such that the gas having a high EGR ratio is sucked is suppressed.

Also, according to the above-described processing, the EGR amount can be restored so that the EGR amount is restrained at necessary timing and thereafter is returned to the normal state. Moreover, according to the above-described processing, in accordance with the amount of gas returning to the upstream side of the compressor 62 at the time when the ABV valve 64 is operated (the amount of the gas 90), when the timing of opening the EGR valve 54 is determined, the timing of opening the EGR valve 54 again can be determined considering the time period required for the passing of the return gas 96. Thereby, the operation of the LPL-EGR system can be restarted at proper timing.

Also, by the execution of the above-described processing in the configuration in accordance with this embodiment, the formation of the fresh air layer on account of the gas 98 as shown in the comparative example can be restrained. As a result, the sudden decrease in EGR ratio can be avoided.

In the above-described embodiment, the supercharger configured by the compressor 62 and the turbine 60 corresponds to the "supercharger" in the before-mentioned first invention, the LPL-EGR system configured by the EGR passage 50, the EGR cooler 52, and the EGR valve 54 corresponds to the "EGR means" in the before-mentioned first invention, the intake air bypass passage 66 corresponds to the "intake air bypass passage" in the before-mentioned first invention, and the ABV 64 corresponds to the "opening/closing means" in the before-mentioned first invention. Also, in the embodiment, by the execution of processing in steps S104 and S106 carried out by the ECU 80 in the routine shown in FIG. 3, the "EGR amount control means" in the before-mentioned first invention is realized.

Also, in the above-described embodiment, the EGR passage 50 corresponds to the "EGR passage" in the before-mentioned fourth invention.

[Modifications in Accordance with the Embodiment]

In the embodiment, the EGR valve 54 in the LPL-EGR system is closed simultaneously with the operation of the ABV 64. However, the present invention is not limited to this operation. Not only the simple method in which the EGR valve 54 is closed when the ABV 64 is opened is applied but the degree of opening of the EGR valve 54 may be decreased when the degree of opening of the ABV 64 exceeds a predetermined degree of opening. Specifically, it may be judged in step S104 whether or not the degree of opening of the ABV 64 has exceeded a predetermined degree of opening. The case where this predetermined degree of opening is zero corresponds to the case where it is judged whether or not the degree of opening of the ABV 64 has exceeded zero, that is, it is judged whether or not the ABV 64 has been opened. Also, in the embodiment, the EGR valve 54 is closed completely. However, the EGR valve 54 need not be closed completely, and the degree of opening of the EGR valve 54 may be decreased to reduce the EGR amount. The operation may be such that a predetermined target degree of opening for controlling the EGR valve 54 at the time when the ABV 64 is operated is determined in advance, and the EGR valve 54 is controlled so that the degree of opening thereof becomes equal to or smaller than the predetermined target degree of opening. With such an operation method as well, the EGR ratio of the return gas 96 is kept low, and thereby, trouble can be reduced such that the gas having an excessively high EGR ratio is generated and sucked when the ABV 64 is operated.

In the embodiment, in determining the opening timing of the EGR valve 54 (EGR restarting timing), the return gas passing time determined by calculation is used. However, the present invention is not limited to this operation. By detecting the amount of passing air by using an air flowmeter or the like, it may be judged whether or not the return gas 96 has passed through. Specifically, after the return gas amount has been estimated in step S108 of the routine shown in FIG. 3, a cumulative intake air amount is determined from the air flowmeter or the like, and it is judged whether or not the gas corresponding to the estimated return gas amount has passed through the intake air passage 26. Thereby, the opening timing of the EGR valve 54 may be determined by judging whether or not the return gas 96 has passed through.

In the embodiment, as explained with reference to FIGS. 2, 4 and 5 in item (2) of "Operation and effects of control device in accordance with the embodiment", the position at which the EGR gas is introduced into the intake air passage 26 in the LPL-EGR system is set on the upstream side of the position at which the intake air bypass passage 66 is connected to the intake air passage 26 on the upstream side of the compressor 62. However, the present invention is not necessarily limited to this configuration. The configuration shown as the comparative example may be used in which the position at which the intake air bypass passage 166 is connected to the intake air passage 26 on the upstream side of the compressor 62 is set on the upstream side of the position at which the EGR valve 54 is connected to the intake air passage 26. Also, the position at which the EGR gas is introduced into the intake air passage 26 in the LPL-EGR system and the position at which the intake air bypass passage 66 is connected to the intake air passage 26 on the upstream side of the compressor 62 may be the same. In such configurations as well, from the viewpoint of restraining excessive addition of exhaust gas, the closing or the decreasing of the degree of opening of the EGR valve 54 according to the operation of the ABV 64 can be performed. Thereby, the gas having an EGR ratio higher than necessary can be restrained from being generated, and the gas having such a high EGR ratio can be restrained from being sucked.

The invention claimed is:

1. A control device for an internal combustion engine comprising:
    a supercharger having a compressor, provided in an intake air passage of the internal combustion engine,
    an EGR unit circulating exhaust gas of the internal combustion engine to the upstream side of the compressor in the intake air passage;
    an intake air bypass passage for connecting the upstream side of the compressor in the intake air passage to the downstream side of the compressor in the intake air passage;
    an opening/closing unit provided in the intake air bypass passage, and
    an EGR amount control unit reducing the amount of exhaust gas circulated to the upstream side of the compressor when the opening/closing unit opens the intake air bypass passage to a degree of opening exceeding a predetermined degree of opening of zero or larger,
    wherein the EGR amount control unit includes an EGR amount recovery device for, after the amount of exhaust gas has been reduced, increasing the amount of the exhaust gas from the reduced level when a predetermined time period has elapsed.

2. The control device for an internal combustion engine according to claim 1, wherein the predetermined time period is a time period of a degree such that the gas which is returned from the downstream side of the compressor to the upstream side of the compressor via the intake air bypass passage by the opening of the intake air bypass passage passes through the position at which the upstream side of the compressor is connected to an EGR passage in the intake air passage.

3. The control device for an internal combustion engine according to claim 1, wherein
    the EGR unit includes the EGR passage one end of which is connected to the upstream side of the position at which the intake air bypass passage is connected to the upstream side of the compressor in the intake air passage and the other end of which is connected to an exhaust gas passage; and
    the EGR amount control unit includes an unit for reducing the amount of exhaust gas flowing in the EGR passage when the opening/closing unit opens the intake air bypass passage to a degree of opening exceeding the predetermined degree of opening.

4. The control device for an internal combustion engine according to claim 1, wherein
    the control device further comprises a second EGR unit for circulating exhaust gas of the internal combustion engine to the downstream side of the compressor in the intake air passage;
    the EGR unit for circulating exhaust gas to the upstream side of the compressor is an LPL(Low Pressure Loop)-EGR system; and
    the second EGR unit for circulating exhaust gas to the downstream side of the compressor is an HPL(High Pressure Loop)-EGR system.

* * * * *

UNITED STATES PATENT AND TRADEMARK OFFICE
CERTIFICATE OF CORRECTION

PATENT NO. : 8,596,065 B2  Page 1 of 1
APPLICATION NO. : 13/000161
DATED : December 3, 2013
INVENTOR(S) : Yoshihiro Okada It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 212 days.

Signed and Sealed this
Twenty-second Day of September, 2015

Michelle K. Lee
*Director of the United States Patent and Trademark Office*